United States Patent [19]

Shinkai et al.

[11] 3,784,868

[45] Jan. 8, 1974

[54] DEGAUSSING CIRCUIT FOR PORTABLE TELEVISION COLOR PICTURE TUBE

[75] Inventors: Kinya Shinkai, Yokohama; Yoshitaka Abe, Tokyo; Masato Izumisawa, Yokosuka, all of Japan

[73] Assignee: Sony Corporation, Tokyo, Japan

[22] Filed: Oct. 20, 1972

[21] Appl. No.: 299,435

[30] Foreign Application Priority Data

Oct. 28, 1971 Japan ..... 46/100456 (utility model)

[52] U.S. Cl. .................................. 315/8, 317/157.5

[51] Int. Cl. .............................................. H01f 13/00

[58] Field of Search ........................ 317/157.5; 315/8

[56] References Cited

UNITED STATES PATENTS 3,582,721 6/1971 Van Hoorn ........................ 315/8 X

*Primary Examiner*—Paul L. Gensler
*Attorney*—Lewis H. Eslinger et al.

[57] ABSTRACT

A degaussing circuit for demagnetizing a color video tube in a portable television receiver in which the degaussing coil current is supplied through a thermistor from the horizontal output circuit of the portable television receiver.

6 Claims, 5 Drawing Figures

DEGAUSSING CIRCUIT FOR PORTABLE TELEVISION COLOR PICTURE TUBE

BACKGROUND OF THE INVENTION

The present invention relates to degaussing circuits for use in color television receivers and more particularly to a degaussing circuit for use in a battery operated color television receiver.

In a color television cathode ray tube, the shadow-mask or so called aperture-grill-mask is deleteriously affected by the earth's magnetism as well as the magnetic fields from motors such as are commonly found in household appliances. In order to prevent this deleterious effect, one or more degaussing coils are wrapped around the color tube and are supplied with an alternating current.

The degaussing current should be decreased in its magnitude gradually as the cathode ray tube is warmed up. Such a degaussing coil arrangement and the details of a circuit for accomplishing this purpose in a color television receiver powered from a standard A.C. line source are described in U.S. Pat. No. 3,571,652, having the same inventor and assignee as this application.

In a portable color television receiver which uses a DC power source, such as a battery, a degaussing circuit such as described in the aforementioned patent is not feasible since it is necessarily powered from the alternating line source.

SUMMARY OF THE INVENTION

A preferred embodiment of the present invention is an improved degaussing system for use with a color television video tube of the type having one or more degaussing coils to demagnetize the color video picture tube wherein the improvement comprises a source of direct current, a current switch, and an inductance connected in series with the DC source and the current switch. At least one of the degaussing coils of the degaussing system is connected in parallel with the inductance and with a means for gradually decreasing the current in the degaussing coil during the warm up of the color video picture tube.

In the preferred embodiment the current switch is the horizontal output amplifier and the inductance is the primary winding of the horizontal fly-back transformer. A pair of degaussing coils are connected in parallel with a capacitor to form a resonant circuit and this resonant circuit is connected in series with a thermistor between the leads of the primary winding of the fly-back transformer.

The horizontal output amplifier circuit provides a saw-tooth shaped voltage to the primary winding of the fly-back transformer and this voltage stimulates a sinusoidal alternating current to flow in the resonant circuit comprised of the degaussing coils and the capacitor. When the television receiver is first turned on by the closing of a main switch, the thermistor causes the sinusoidal current in the degaussing coils to gradually decrease from a maximum value to a minimum value as the resistance of the thermistor increases during the warm up of the television receiver.

In one preferred embodiment the deflection coil is connected in series with a raster linearity compensation capacitor across the leads of the primary winding of the horizontal fly-back transformer. In still another embodiment a separate horizontal amplifier circuit is provided to drive the deflection coil separately from the fly-back transformer and the degaussing circuit. The purpose of this second embodiment is to allow the use of relatively low power transistor amplifiers in the horizontal output circuits.

It is therefore an object of the present invention to provide a degaussing circuit for use in a DC powered portable color television receiver.

It is still another object of the invention to provide a degaussing circuit which is low in cost and simple in design for use in a portable color television receiver.

The foregoing and other objectives, features, and advantages of the invention will be more readily understood upon consideration of the following detailed description of certain preferred embodiments of the invention, taken in conjunction with the accompanying drawings.

DETAILED DESCRIPTION OF CERTAIN PREFERRED EMBODIMENTS

Figure 1:
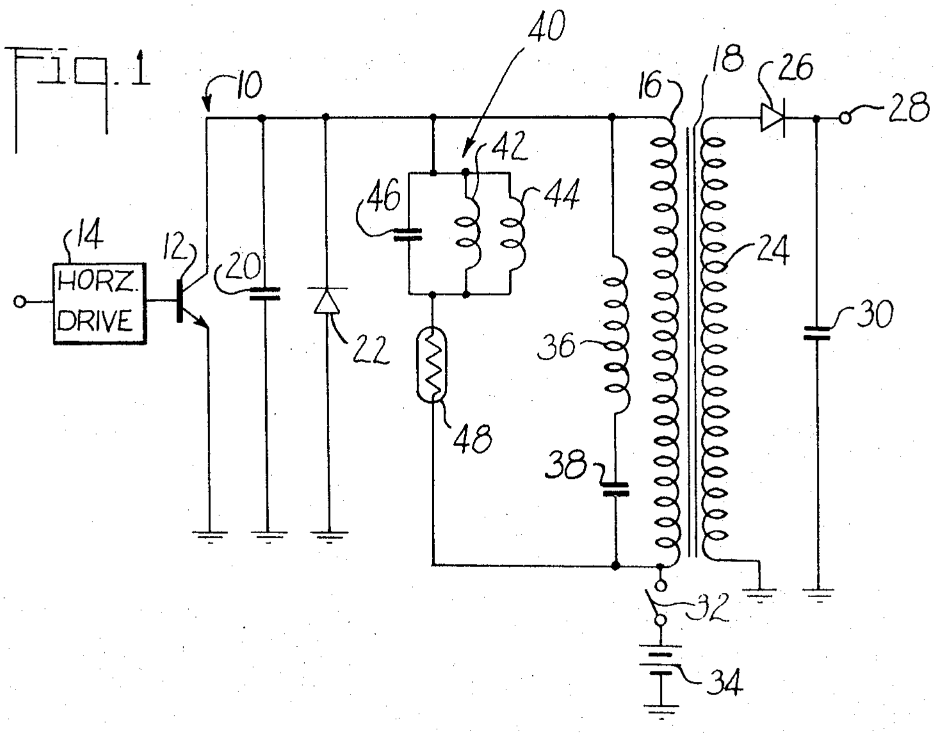
FIG. 1 is a schematic circuit diagram of one embodiment according to the invention.

Referring now more particularly to FIG. 1 a horizontal deflection circuit generally designated 10 is illustrated as modified for the purposes of the present invention. The circuit includes a horizontal current switching transistor 12 having its base electrode connected to the output of the horizontal drive circuit 14 and its emitter electrode connected to the circuit ground. The collector electrode of the transistor 12 is connected to one lead of the primary winding 16 of the fly-back transformer 18. A capacitor 20 and a damper diode 22 are connected in parallel between the emitter and collector electrodes of the transistor 12.

One lead of the secondary winding 24 of the fly-back transformer 18 is connected to the anode of a diode 26 whose cathode is connected to an output terminal 28 which supplies high voltage D.C. current to other circuits in the television receiver. The other lead of the secondary winding 24 is connected to the circuit ground. A capacitor 30 is connected between the terminal 28 and the circuit ground.

The other lead of the primary winding 16 is connected to one pole of a single pole, single throw switch 32. The contact arm of the switch 32 is connected to one terminal of a DC power source, such as a battery 34. The other terminal of the DC power source 34 is connected to the circuit ground.

A deflection coil 36 is connected in series with a raster linearity compensation capacitor 38 between the leads of the primary winding 16. Also connected between the leads of the primary winding 16 is a degaussing circuit generally designated 40.

The degaussing circuit 40 includes two degaussing coils 42 and 44 connected in parallel with each other and with a capacitor 46 to form a resonant circuit. Typically this circuit is resonant at 15.75 KHz. This resonant circuit is connected in series with a thermistor 48 between the leads of the primary winding 16.

Figure 2A:
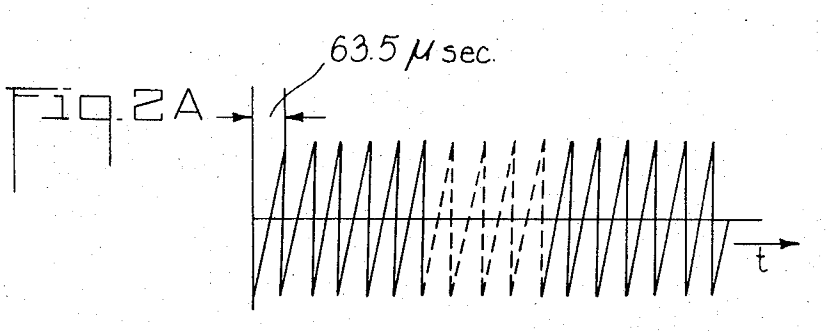
FIGS. 2A, 2B and 2C are diagrammatic illustrations of the signal waveforms of the embodiment depicted in FIG. 1.
Figure 2B:
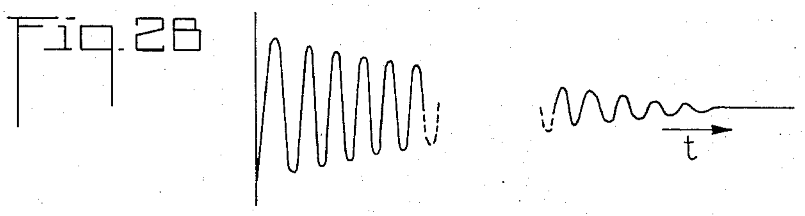
Figure 2C:
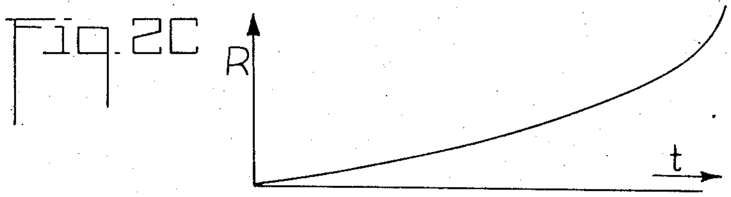

With reference now more particularly to FIGS. 2A, 2B and 2C, in operation the output current from the transistor 12 generates a saw-tooth current in the deflection coil 36 as is illustrated in FIG. 2A. The saw-tooth voltage causes a sinusoidal current to flow in the resonant degaussing circuit 40 as is illustrated in FIG. 2B.

The resistance versus time characteristic of the thermistor is illustrated in FIG. 2C. From the figure it is clear that as the time during which current flows through the thermistor increases the resistance of the thermistor likewise increases. This has the effect of gradually limiting the current which flows through the degaussing coils 42 and 44 so that the sinusoidal current in the coils tapers down to a minimum value as illustrated in FIG. 2B when the television receiver has warmed up.

One advantage of using the horizontal deflection circuit to power the degaussing coil is that this eliminates the necessity for a separate DC to AC converter which would otherwise be necessary. Thus the circuit construction is simplified.

Figure 3:
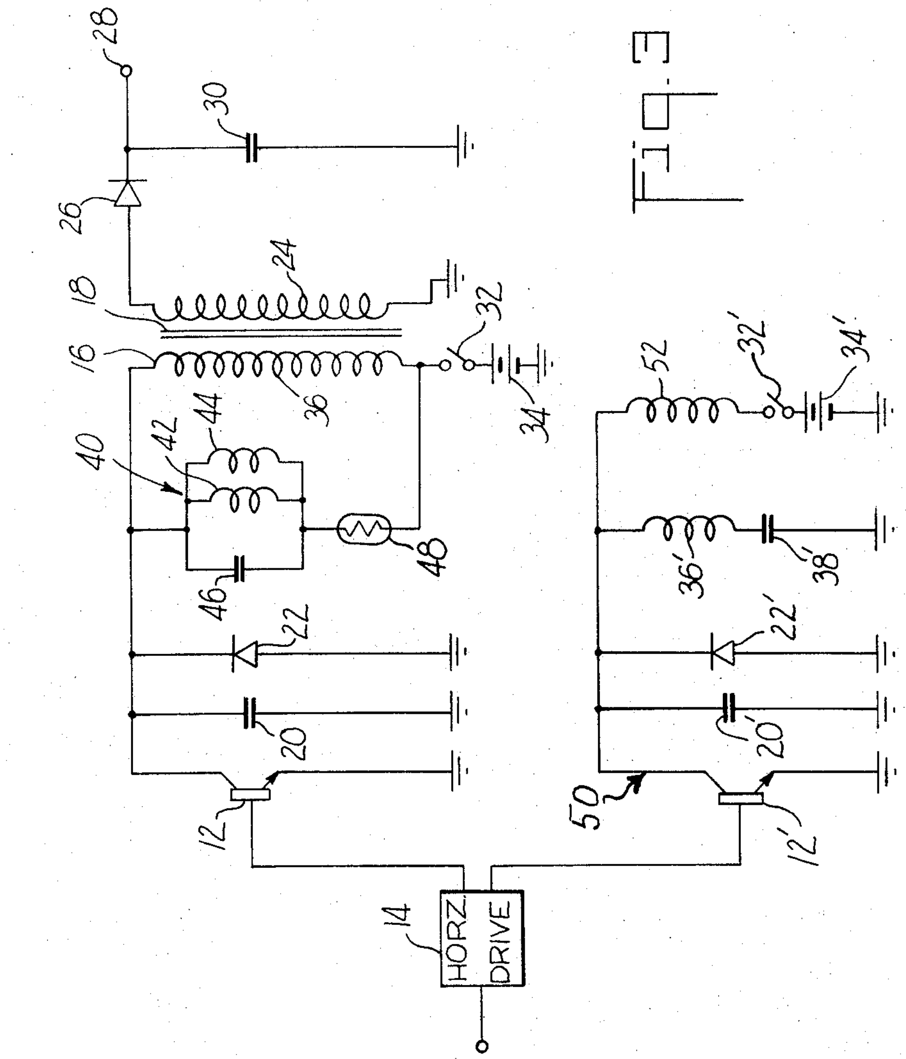
FIG. 3 is a schematic circuit diagram of a second embodiment of the invention.

Referring now more particularly to FIG. 3 in a second embodiment of the invention the same basic circuit as described in reference to FIG. 1 is utilized in conjunction with a separate horizontal deflection circuit 50 constructed in substantially the same manner as the circuit 10 described above. The deflection coil 36' and the capacitor 38' are not connected in parallel with the fly-back transformer and the primary winding 16 but instead are connected across the output of the additional horizontal deflection circuit 50. In place of the primary winding 16 a choke coil 52 is connected in series with a single pole, single throw switch 32' and a DC power source 34'. The other lead of the power source 34' is connected to the circuit ground. The remaining components operate in substantially the same manner as the components described in reference to the embodiment of FIG. 1 and have been designated with the same reference numbers primed.

No details of the physical arrangement of the degaussing coils on the color picture tube have been given in this specification since such arrangements are now well known in the art, as exemplified by the arrangement disclosed in the aforementioned U.S. Pat. No. 3,571,652.

The terms and expressions which have been employed here are used as terms of description and not of limitation, and there is no intention in the use of such terms and expressions, of excluding equivalents of the features shown and described, or portions thereof, it being recognized that various modifications are possible within the scope of the invention claimed.

What is claimed is:

1. An improved degaussing system for use with a color television of the type having one or more degaussing coils to demagnetize the color video picture tube, wherein the improvement comprises a source of direct current, a current switch, and an inductance, the inductance, the direct current source and the current switch being connected together to form a closed series circuit, and a degaussing circuit connected in parallel with the inductance, the degaussing circuit including at least one degaussing coil of the degaussing system, capacitance means connected in parallel with the one degaussing coil to form a circuit which is resonant at a predetermined frequency, and means for gradually decreasing the current in the degaussing coil during the warm up of the color video picture tube.

2. An improved degaussing system as recited in claim 1 wherein the predetermined frequency is substantially 15.75 KHz.

3. An improved degaussing system as recited in claim 1 wherein the degaussing circuit comprises at least a pair of degaussing coils connected in parallel with each other and the capacitor is connected in parallel with the degaussing coils.

4. An improved degaussing system as recited in claim 1 wherein the current switch comprises means for generating a saw-tooth shaped voltage waveform.

5. An improved degaussing system as recited in claim 1 wherein the means for gradually decreasing the current in the degaussing coil comprises a thermistor connected in series with the one degaussing coil.

6. An improved degaussing system for use with a color television having a horizontal output amplifier, a source of direct current, and a fly-back transformer having a primary winding connected in series with the source of direct current between the output terminals of the horizontal output amplifier, the degaussing system being of the type having one or more degaussing coils to demagnetize the color video picture tube, wherein the improvement comprises a capacitor connected in parallel with at least one of the degaussing coils to form a circuit which is resonant at an integral multiple of the frequency of the output signal from the horizontal amplifier, means for connecting the degaussing coil between the leads of the fly-back transformer primary winding and means for gradually decreasing the current flow in the degaussing coil over a predetermined period of time beginning with the start of current flow in the degaussing coil.

* * * * *